(12) United States Patent
Gilley

(10) Patent No.: US 6,215,876 B1
(45) Date of Patent: *Apr. 10, 2001

(54) APPARATUS FOR AND METHOD OF DETECTING INITIALIZATION VECTOR ERRORS AND MAINTAINING CRYPTOGRAPHIC SYNCHRONIZATION WITHOUT SUBSTANTIAL INCREASE IN OVERHEAD

(75) Inventor: James E. Gilley, Lincoln, NE (US)

(73) Assignee: Transcrypt International, Inc., Lincoln, NE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/001,832

(22) Filed: Dec. 31, 1997

(51) Int. Cl.[7] .................................................. H04L 9/00
(52) U.S. Cl. ........................ 380/260; 380/261; 380/274
(58) Field of Search .............................. 380/48, 221, 225, 380/244, 260, 261, 274; 713/154

(56) References Cited

U.S. PATENT DOCUMENTS

| | | |
|---|---|---|
| 4,078,152 | 3/1978 | Tuckerman, III . |
| 4,160,120 | 7/1979 | Barnes et al. . |
| 4,440,976 | 4/1984 | Bocci et al. . |
| 4,649,543 * | 3/1987 | Levine .................................. 714/774 |
| 4,731,843 | 3/1988 | Holmquist . |
| 4,754,482 | 6/1988 | Weiss . |
| 4,815,130 | 3/1989 | Lee et al. . |
| 4,827,507 | 5/1989 | Marry et al. . |
| 4,893,339 * | 1/1990 | Bright et al. ............................ 380/28 |
| 4,972,469 | 11/1990 | Saltwick et al. . |
| 5,054,067 | 10/1991 | Moroney et al. . |
| 5,060,265 | 10/1991 | Finkelstein . |
| 5,060,266 | 10/1991 | Dent . |
| 5,148,485 | 9/1992 | Dent . |
| 5,191,610 | 3/1993 | Hill et al. . |
| 5,195,136 | 3/1993 | Hardy et al. . |
| 5,199,069 | 3/1993 | Barrett et al. . |
| 5,214,694 | 5/1993 | Furuya et al. . |
| 5,214,701 | 5/1993 | Quisquater et al. . |
| 5,235,644 | 8/1993 | Gupta et al. . |
| 5,274,707 | 12/1993 | Schlafly . |
| 5,321,754 | 6/1994 | Fisher et al. . |
| 5,365,588 | 11/1994 | Bianco et al. . |
| 5,412,729 | 5/1995 | Liu . |
| 5,420,928 | 5/1995 | Aiello et al. . |
| 5,432,848 | 7/1995 | Butter et al. . |
| 5,442,705 | 8/1995 | Miyano . |
| 5,452,358 | 9/1995 | Norile et al. . |
| 5,528,693 | 6/1996 | Leopold . |
| 5,530,959 | 6/1996 | Amrany . |
| 5,539,827 | 7/1996 | Liu . |
| 5,561,713 | 10/1996 | Suh . |
| 5,574,785 | 11/1996 | Ueno et al. . |
| 5,604,806 | 2/1997 | Hassan et al. . |
| 5,606,322 | 2/1997 | Allen et al. . |
| 5,606,616 | 2/1997 | Sprunk et al. . |
| 5,613,005 | 3/1997 | Murakami et al. . |
| 5,631,960 | 5/1997 | Likens et al. . |
| 6,128,358 * | 10/2000 | Urata ..................................... 375/366 |

* cited by examiner

Primary Examiner—Tod Swann
Assistant Examiner—Steve Kabakoff
(74) Attorney, Agent, or Firm—Zarley, McKee, Thomte, Voorhees & Sease

(57) ABSTRACT

An apparatus and method for detecting erroneous initialization vectors transmitted over a communications channel and maintaining cryptographic synchronization by comparing a received vector with a predicted correct vector. The vectors are random-like in nature by utilizing a pseudo-random number generator having a long overall cycle length. If the level of bit errors of the comparison is relatively small, considering the predicted vector is considered correct and used for synchronization, but if the number of bit errors of the comparison is relatively large, the predicated vector is considered in correct.

26 Claims, 3 Drawing Sheets

APPARATUS FOR AND METHOD OF DETECTING INITIALIZATION VECTOR ERRORS AND MAINTAINING CRYPTOGRAPHIC SYNCHRONIZATION WITHOUT SUBSTANTIAL INCREASE IN OVERHEAD

BACKGROUND OF THE INVENTION

1. Field of the Invention

The invention relates to detection of errors in received cryptographic synchronization initialization vectors used for securing communications over a communications channel, and in particular, to an apparatus and method of evaluating whether a received initialization vector, even if erroneous, is due to channel errors or to an incorrect initialization vector, all without substantially adding to overhead of the communication.

2. Problems in the Art

One conventional way to secure communications over a communications channel, for example two-way radio, is to encrypt the information, whether voice or data. A widely used encryption method is the use of block ciphers such as Data Encryption Standard (DES) operating in an output feedback mode (OFM).

As is well known in the art, DES in OFM uses an initialization vector (IV) to seed the encryption algorithm in DES with a beginning value. IV is usually changed over time. Optimally, it is changed in a pseudo-random fashion. The more that IV looks like a random number, the better the security of the encryption method. DES and DES modes of operation are discussed in detail in Federal Information Processing Standard FIPS-46-2 and FIPS-81, published by the National Institute of Standards and Technology.

There are many types of secure communications systems (e.g. encryption and scrambling) that utilize initialization vectors (IVs) to achieve cryptographic synchronization (crypto sync). Many secure communications systems utilize ciphers operating in one of several feedback modes, and IVs are used to initialize the ciphers.

To decrypt an encrypted message that utilizes IV, the receiver must know IV precisely. The receiver decryption system has to essentially reverse engineer the true content of the communication by reversing the encryption process. To do so, the receiver must know the precise IV for the relevant precise piece or block of encrypted communication that is based on that IV. Thus IV must be communicated to the receiver over a communications channel. In many applications, IV can be many bits long. For example, in DES, IV is conventionally 64 bits long.

In a perfect communications channel, IV could be expected to be transmitted and received without error in any bit. However, most communications channels are not perfect, and some are very noisy or subject to fading. As is discussed in U.S. Pat. No. 5,195,136, many or most communications channels have noise or fading which can corrupt IV so that some bits are received in erroneous form.

Many times IV is sent repeatedly throughout a transmitted communication to enable the receiver to achieve late entry to a communication or to reestablish synchronization during a communication. A 64 bit IV can take up appreciable headroom or overhead when repeated in that manner. Furthermore, statistically, the probability of error in each bit of the 64 bit IV can be quite substantial. If only one bit is erroneous, cryptographic synchronization is prevented and decryption is prevented. Therefore, achievement, maintenance and re-establishment of cryptographic synchronization is a significant problem. Without such synchronization on a substantially continuous basis, the received message is broken up, or, in bad conditions, no intelligible parts of the message are recovered.

Two examples of how the state of the art has attempted to deal with the problems caused by errors in received IVs are discussed below. One method employs forward error correcting (FEC) codes to minimize the adverse effects of the channel. However, this adds overhead to the system, which may not always be possible or desirable. FEC codes are discussed at Lin, Shu and Costello, Daniel J., "Error Control Coding: Fundamentals and Applications", Prentice-Hall 1983, which is incorporated by reference herein.

Another method detects errors, instead of correcting them. For instance, some systems employ what is well known in the art as coasting, which is the ability to continue to operate properly even when an IV has been received in error. A reference discussing coasting is U.S. Pat. No. 4,893,339, entitled "Secure Communication System", which is incorporated by reference herein.

This is often done by using a sequence of IVs which may be predicted by the receiver, such as might be generated by a linear feedback shift register. Under such conditions it is only necessary to determine whether or not the received IV contains errors. If errors are detected, the receiver utilizes the predicted IV to maintain crypto sync, and ignores (or coasts over) the actually received but erroneous IV.

However, the process of detecting erroneous IVs consists of using error detection codes, of which a cyclic redundancy check (CRC) is most commonly employed. As with error correcting codes, error detecting codes add overhead to the system, which may not be possible or desirable.

The Telecommunications Industry Association Standard TIA/EIA/IS-102.AAAA sets forth an example which illustrates many of the prior art concepts referenced herein.

A general reference on cryptography and random numbers is *Applied Cryptography, Second Edition*, by Bruce Schneier, published by John Wiley & Sons in 1996.

Thus, while these error correcting and error detecting methods can work, the overhead needed to facilitate them is substantial. Therefore, there is a real need in the art for an error detection system which does not substantially increase overhead to the communication but improves maintenance of crypto sync.

It is therefore a primary object of the present invention to provide an apparatus and method for detecting erroneous initialization vectors and maintaining crypto sync without increase of overhead by using error correcting or error detecting codes.

Further objects, features, and advantages of the present invention include an apparatus and method as above-described which:

1. do not substantially increase overhead in the communication.
2. provide an efficient and reasonably accurate way to distinguish between errors in a received IV caused by channel transmission problems and an incorrect predicted IV, so that cryptographic synchronization can be sustained at a high level.
3. are flexible and adaptable in their application, implementation and use, including different methods of securing communications.
4. are especially useful when communicating information over a communications channel that is less than ideal with respect to possible corruption of the information being transmitted.

5. can detect and remedy synchronization errors even in less than perfect communications channels.

6. can achieve and maintain cryptographic synchronization even when initialization vectors are partially or wholly destroyed by channel conditions or burst errors.

7. can indicate that a predicted vector has been incorrectly calculated or that there is some other problem with cryptographic sync.

These and other objects, features and advantages of the present invention will become more apparent with reference to the accompanying specification and claims.

SUMMARY OF THE INVENTION

The present invention includes an apparatus and method for maintaining cryptographic synchronization where initialization vectors are transmitted over communications channels to facilitate such synchronization. The method compares the actual received initialization vector (IV) with a predicted IV. If any errors exist, the magnitude of errors is quantified. If the magnitude of errors is smaller than a predetermined level, any errors are assumed to be caused by the communications channel corrupting IV, and the predicted IV is assumed correct and used for cryptographic sync. If the magnitude of errors is not smaller than the predetermined level, other assumptions are made.

The apparatus according to the invention includes a device using a block cipher. The device includes a receiver to receive a communication which includes an initialization vector for cryptographic sync. A component predicts IV and compares the predicted IV with the received IV and coasts over the received IV if the comparator reveals the received IV is erroneous, but contains relatively few errors.

DETAILED DESCRIPTION OF PREFERRED EMBODIMENTS

Overview

Figure 1:
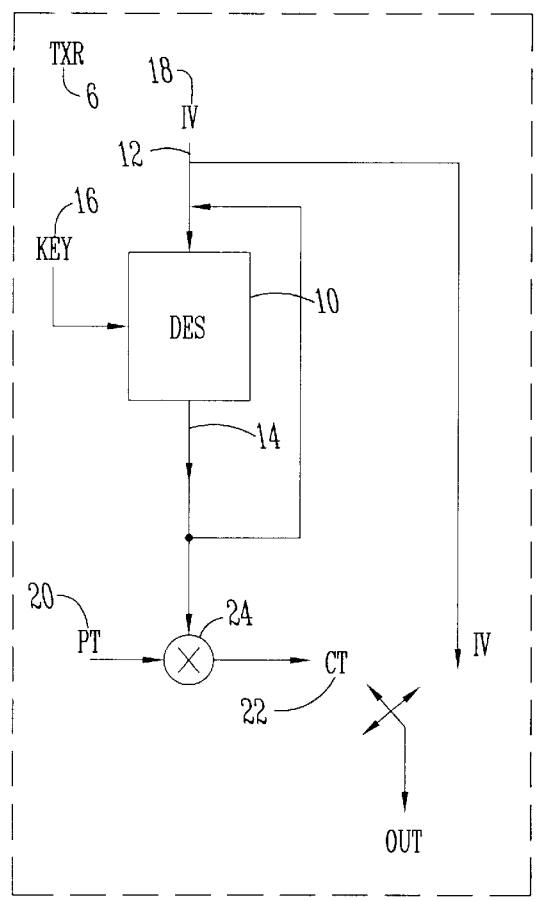
FIG. 1 is a block diagram depiction of a transmitter for a block cipher system utilizing DES according to the prior art.

To assist in a better understanding of the invention, a description of one embodiment or form the invention can take will now be set forth in detail. Frequent reference will be taken to the drawings. Reference numbers will sometimes be utilized to indicate certain parts or locations in the drawings. The same reference numbers will be used to indicate the same parts and locations throughout the drawings unless otherwise indicated.

This description will be in the context of encryption of information, and in particular, to the encryption of information using block cipher techniques. The information can be any of a variety of types, including data (e.g. numerical or text) or audio (e.g. voice), or combinations thereof. However, the invention is relevant to other types of methods of securing communication, including analog scrambling and other types of encryption whereby an initialization vector is utilized, such as are known in the art.

Furthermore, the preferred embodiment is in the context of a block cipher that operates by receiving an initialization vector which has a length of a plurality of bits, and which changes over time.

STRUCTURE OF PREFERRED EMBODIMENT

FIG. 1 illustrates diagrammatically a conventional way of operation of a block cipher 10 in a transmitter 6 (e.g. full duplex radio). Here block cipher 10 is the Data Encryption Standard (DES) operating in output feedback (OFB) mode, such as is well known in the art. The details of the same will not be repeated here. Cipher 10 receives a 64 bit input 12 (IV), and creates a 64 bit output 14. A 56 bit secret key or crypto variable 16 is also input to DES 10. Key 16 assists in preventing others from being able to know the pattern of output 14 as it is secret except to the authorized transmitter and receiver(s).

The input 12 is referred to as an initialization vector (IV) 18. IV 18 is the same length as the input and output of DES 10. It provides another variable to DES 10 to assist in the prevention of others from knowing or predicting the output 14 of DES 10. By methods well know in the art, output 14 essentially is a pseudo random number stream created in 64 bit blocks. It has a relatively long overall cycle length, generally $2^{64}-1$, and therefore is considered highly secure from unauthorized persons predicting the pseudo-random sequence.

Output 14 is combined with 64 bit chunks of the information that is to be encrypted (the digital input 20) to create the encrypted output (digital data output 22). In this example, data input 20 is the plaintext (PT), or the digitized information to be encrypted, which otherwise would be decodable and understandable by an interloper. Data output 22 is ciphertext (CT), the encrypted plaintext which then can be transmitted in highly secured form. The combination of data input 20 with output 14 of DES 10 is by exclusive OR (see reference numeral 24) of corresponding bits in the 64 bit blocks. Data output 22 is a 64 bit block.

Figure 3:
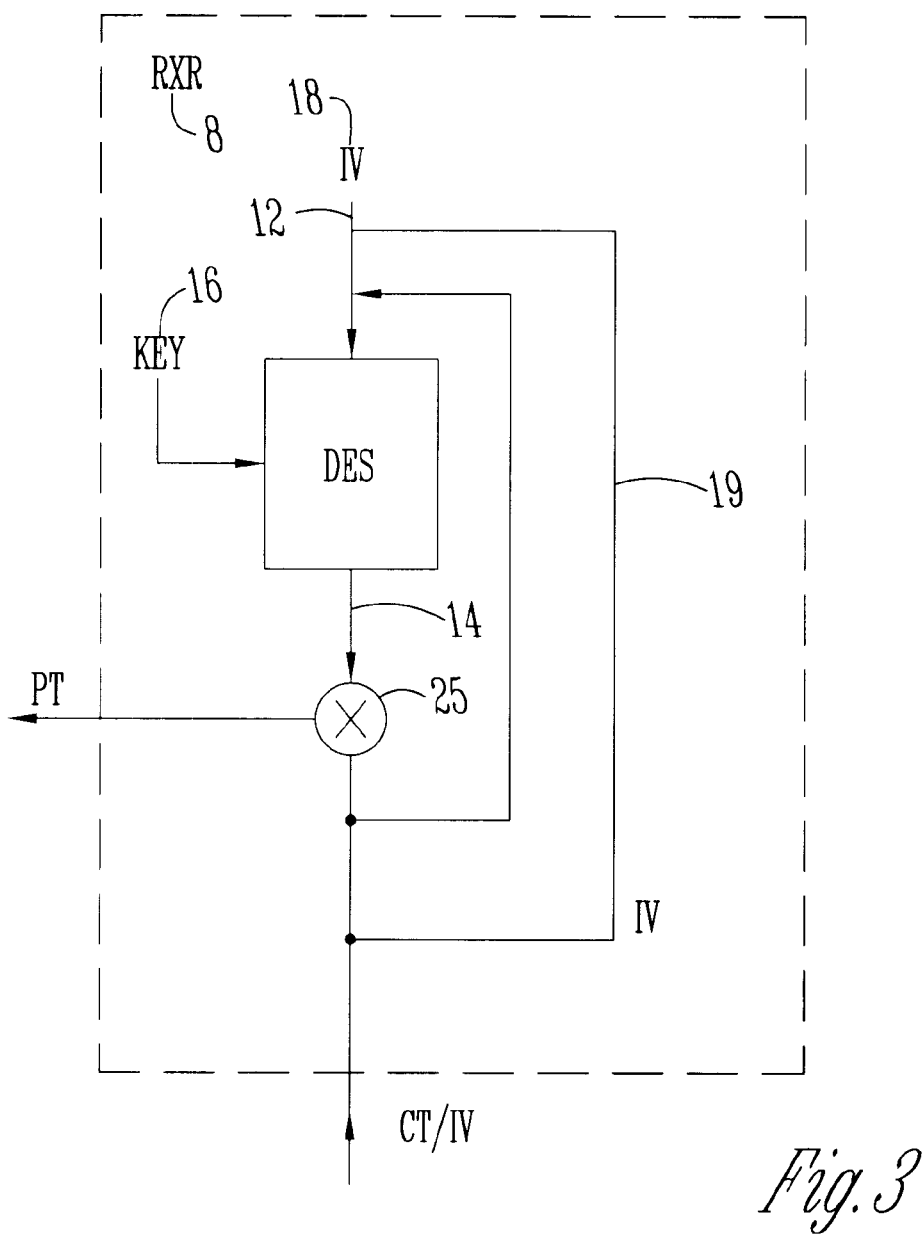
FIG. 3 is a block diagram depiction of a receiver for a block cipher system utilizing DES according to the prior art.

FIG. 3 illustrates that to decrypt data output 22, the reverse of what has been described above is performed. The encrypted message is received in blocks. The receiver knows key 16. The encrypted blocks are fed as an input into DES 10. As is well known, decryption also requires that the receiver know precisely the initialization vector (IV) 18 for each block of encrypted data. With these things, DES 10 can essentially reconstruct the original pseudo random 64 bit long string for each block of ciphertext, conduct the reverse of exclusive OR (at 25), and extract the original plaintext (PT).

Figure 2:
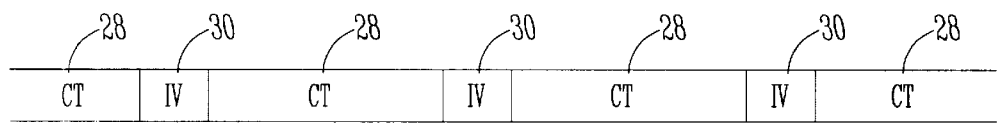
FIG. 2 is a diagrammatic depiction of a transmitted signal of encrypted digital information with intermittent data sections which include an initialization vector.

The conventional method of allowing receiver(s) to continuously know IV 18 is to transmit it between transmitting device 6 and receiving device 8. FIG. 2 diagrammatically illustrates a conventional transmitted encrypted message 26. It is made up of sections 28 of encrypted information and intermittent data sections 30 that can include IV 18. Therefore, as is well known in the art, receiving unit 8 would separate sections 30, including IV 18, from the cipher text CT and use the extracted IVs (see reference number 19) to achieve cryptographic sync. It would do the same to maintain crypto sync. Also, it would do the same to reestablish or reenter crypto sync if ever lost during a transmitted message.

The foregoing describes well known prior art cipher block feedback mode, preferably OFB mode, digital encryption with late entry capability. The system permits late entry, which is the ability of a receiver to join into the secure conversation at any time throughout the message. The functions illustrated in FIGS. 1 and 2 are primarily implemented in software in a digital signal processor (e.g. Texas instruments TM 320F206 DSP). The details of the hardware for such systems, as well as the use of a DSP for the function of such devices are well known or well within the skill of those skilled in the art, and thus will not be repeated here. The block cipher is the Digital Encryption Standard in OFB mode using a 64 bit IV. The function of coasting, which allows a receiver that has achieved cryptographic synchronization to predict the correct initialization vector should one be received in error is also employed in the DSP. This allows the receiver to coast through periods when the channel may be corrupting the encrypted message.

In order to coast, the receiver must be able to predict the correct IV and detect errors in the received IV. Systems which implement predictive IVs are well known in the prior art (see e.g. TIA IS-102.AAAA). Coasting systems therefore have to (a) predict the correct IV, (b) detect if the received IV does not match the predicted IV and, further, (c) if so, ignore or coast by the received IV and use the predicted IV to maintain crypto sync.

The preferred embodiment therefore utilizes the well known prior art aspects of DES cipher block OFB mode encryption and coasting to maintain crypto sync, in the presence of bit errors to transmitted IV caused by the communications channel, but without error correction or detecting codes. Thus no overhead increase of the type created by such codes exists, which is beneficial to the system and to the communications.

The present invention makes use of certain facts involving communications impairments and statistical properties of pseudo random numbers to detect errors in the received IV. First, predicting the probability of bit errors for a communications channel is well known in the art. Specifically, if a channel is subject to average white gaussian noise (AWGN) with a static bit error rate of p, then the probability that an n-bit message will contain m bit errors is given by:

$$P(\text{n-bit message has m errors})=(1-p)^{(n-m)} \cdot (p)^m \cdot n!/[m! \cdot (n-m)!]$$

The foregoing equation is discussed at the Lin & Costello reference, previously cited and incorporated by reference herein.

Second, knowing the probability of bit errors allows a prediction of how many erroneous bits will be caused by a given channel for a 64 bit IV. Suppose the bit error rate (BER) is $10^{-2}$. The probabilities of varying numbers of bit errors are: P(0 errors)=0.5256, P(1 error)=0.3398, P(2 errors)=0.1081, P(3 errors)=0.0226, P(4 errors)=0.0035, and so on. Note that the probability of a large number of errors is much smaller than the probability of a small number of errors. In fact, as the number of errors grows, the probability falls off exponentially and approaches zero as the number of errors becomes large.

Third, the preceding statistical probabilities allow the assumption to be made that any reasonable communications channel will only result in a few bit errors (say less than 4 of 64) in the IV. The assumption is possible because there is an approximately 2% chance three bit errors will occur for any 64 bit IV and a 0.3% chance that four errors will occur. Because the probability of 5, 6, 7 etc. bit errors will occur gets so small, it is reasonable to ignore them as practical possibilities.

Fourth, if the IVs are generated by a good pseudo-random source, like a cipher operating in output feedback mode, then all IVs are very random-like, and comparing any two IVs is essentially the same as comparing two random numbers. For a random number, or a pseudo-random number of good quality, all the bits are statistically independent. This means that for each bit in the number, it is equally likely to be a zero or a one, independent of the values of all other bits. Therefore, when two numbers with this property are compared, the following is a reasonable assumption: the probability that a given bit of one number is the same as a given bit of the other number is 0.5, which is also the same as the probability that a given bit of one number is different from a given bit of the other number. Furthermore, when multiple bits are compared, it can be easily shown that the probability that m bits of two n-bit numbers are different is given by:

$$P(\text{m bits of 2 n-bit \#s differ})=0.5^{(n-m)} \cdot 0.5^m \cdot n!/[m! \cdot (n-m)!]$$

For example, suppose two 64-bit pseudo-random IVs are compared and the number of bits in which these two IVs differ are counted, and the result is called the number of errors between the two IVs. According to the above, the probability of various numbers of errors is computed as:

P(0 errors)=P(64 errors)=5.4 $\cdot 10^{-20}$, P(1 error)=P(63 errors)= 3.5·$10^{-18}$, . . . , P(30 errors)=P(34 errors)=0.0878, P(31 errors)=P(33 errors)=0.0963, and P(32 errors)=0.0993.

Fifth, when comparing two n-bit 'random' numbers (pseudo-random IV's generated as described herein), it is most likely that the numbers differ in about n/2 bits; and there essentially will never be the situation where all the bits are the same or all the bits are different. In fact, the probabilities fall off rapidly as one departs from the n/2 number and moves toward either extreme. Therefore, it is reasonable to conclude that when comparing two 'random' numbers, a large number of errors (say about 32 for this example) can be expected.

Figure 4:
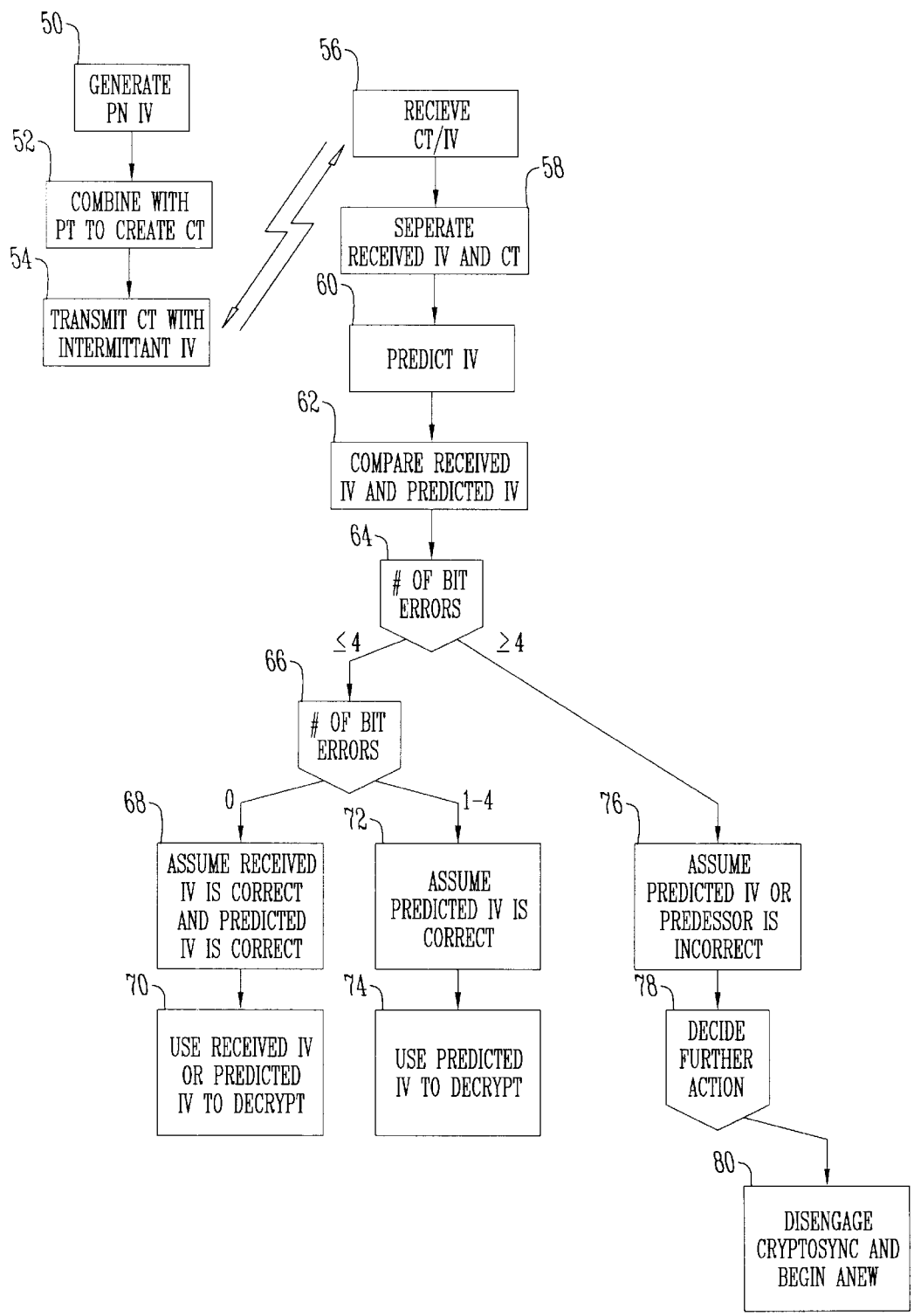
FIG. 4 is a flow chart illustrating in functional blocks a system according to a preferred embodiment of the present invention.

The invention makes use of these facts presented above in order to determine if a received IV is in error. FIG. 4 illustrates an example of operation of the invention. A transmitting device generates a strong pseudo-random IV (50), combines IV with plaintext PT to create ciphertext CT (52) and transmits CT with intermittent IV (54) (see also FIGS. 1–3).

The receiver obtains the CT/IV transmission (56)(FIG. 2), separates (T and IV) (58), and simultaneously predicts what IV for that moment should be (60). Suppose the receiver has predicted the value of an IV it expects to receive. Once it actually receives the IV, it will compare the received IV to the predicted IV (62), and calculate the number of bits which are in disagreement (i.e. bit errors) (64). If this number is zero (66/68), then it obviously has received the correct IV. The receiver can either use the received or predicted IV, because both are identical (70). However, if the number is not zero, then something is wrong. In this case, there are two reasonable possibilities: (a) the anticipated IV is received, but it had bit errors caused by channel impairments; or (b) the IV was incorrectly predicted because an erroneous IV had been previously accepted as being valid.

If the errors are due to channel impairments, then from the above, a fairly small number of bit errors are expected, e.g. about 4 or less for a 64 bit IV (66/72). However, when previously incorrect information had been accepted, and then used to predict an IV, comparing the predicted IV to the received IV would be like comparing two random numbers, and a large number of errors, say about 32 for a 64-bit IV, would be expected (66/76).

Thus, if the number of errors is small (66/72), the predicted IV is used (74) and assigned a high confidence of being correct (72). However, if the number of errors is large (e.g. ≧4 bit errors) (66/76), it is concluded that the predicted IV is wrong (76), and appropriate action can be taken (78), which might consist of dropping crypto-sync and attempting to re-acquire it from the received IV (80). Alternately, it is important to understand that the invention does not need any sort of error detecting code, and as such adds no overhead to the channel.

Thus, the invention solves the problem of identifying an erroneous cryptographic initialization vector in an advantageous fashion. Specifically, it provides a means to make this identification without the use of any error detecting code or other overhead.

The primary use of the present invention is detect erroneous IVs and take appropriate action. As presently envisioned, this invention will be used in an analog scrambler, such as Transcrypt International model SC20-DES.

Options and Alternatives

It will be appreciated that the present invention can take many forms and embodiments. The true essence and spirit of this invention are defined in the appending claims, and it is not intended that the embodiment of the invention presented herein should limit the scope thereof. There are numerous ways in which it may be advantageously applied, which should be obvious to those skilled in the art.

For example, block cipher 10 can be DES or some other encryption method that uses a IV or its equivalent. If DES is used, it could be in a variety of modes, including CFB or OFB.

What is claimed:

1. A method of maintaining cryptographic synchronization in less than ideal communication channel conditions, comprising: generating pseudo-random initialization vectors IV having a
    plurality of bits in random-like manner and transmitting the IVs interspersed within a data stream from a transmitter to a receiver;
    receiving IVs and data at the receiver;
    predicting correct IVs at the receiver without extracting at that time a received IV;
    comparing a received IV to a predicted IV on a bit by bit basis;
    if the number of bit differences are at or below a first level, utilizing the predicted IV for cryptographic synchronization.

2. The method claim 1 wherein the step of generating is in a cipher in feedback mode.

3. The method of claim 1 wherein if the bit differences are at or above a second level, the predicted IV for cryptographic synchronization is not utilized for cryptographic synchronization.

4. The method of claim 3 wherein if the bit differences are above the second level and correspond to a probability of error, consider the predicted IV to be erroneous.

5. The method of claim 1 wherein the step of predicting is accomplished by a coasting technique.

6. The method of claim 1 wherein the first level is less than 50% bit differences.

7. The method of claim 6 wherein the first level is less than 25% bit differences.

8. The method of claim 3 wherein the second level is approximately 50% bit differences.

9. The method of claim 8 wherein the approximately 50% bit differences is 45% to 55% bit difference.

10. The method of claim 1 wherein the IV is 64 bits in length.

11. The method of claim 10 wherein the first level is 4 bit differences.

12. The method of claim 10 wherein if bit differences are above a second level, the predicted IV is not utilized for cryptographic synchronization and wherein the second level is 32 bit differences.

13. The method of claim 3 wherein if the bit differences are at or above the second level, cryptographic synchronization is disengaged and re-synchronization is started.

14. A method of compensating for channel impairments in a communications system operating a digital block cipher in OFB mode and transmitting digital cryptographic synchronization information for cryptographic synchronization and late entry comprising:
    transmitting in the communications channel X bit in length periodic IVs having a plurality of bits generated at the transmitter by the block cipher in OFB;
    receiving at the receiver the transmitted IVs;
    calculating the probability of bit errors in said communications channel;
    predicting the number of bit errors that will normally be caused by said channel and designating the number as a first value;
    generating at the receiver a predicted IV without extracting at that time a received IV;
    comparing the received and predicted IVs bit by bit; and
    calculating a bit error number based on the differences between the bits of the received and predicted IVs.

15. The method of claim 14 further comprising if the bit error number is zero, consider the predicted IV correct.

16. The method of claim 15 further comprising utilizing the predicted IV for cryptographic synchronization.

17. The method of claim 15 further comprising utilizing the received IV for cryptographic synchronization.

18. The method of claim 14 further comprising if the bit error number is substantially less than X/2, ignore the received IV, and utilize the predicted IV for cryptographic synchronization.

19. An apparatus for maintaining cryptographic synchronization which receives pseudo-random IVs of a plurality of bits in length comprising:
    a receiver operatively in communication with a communications channel, the receiver receiving periodic transmitted IVs;
    a coasting component in the receiver including an IV predictor;
    a bit error detector which can produce a low bit error signal;
    a selection component which utilizes the predicted IV for cryptographic synchronization if the bit error detector issues a low bit error signal.

20. The apparatus of claim 19 including a transmitter including an IV generator which produces IVs of random-like character.

21. The apparatus of claim 20 wherein the IV generator is a pseudo-random number generator.

22. The apparatus of claim 21 wherein the pseudo-random number generator is a block cipher.

23. The apparatus of claim 22 wherein the block cipher is operated in output feedback mode.

24. The apparatus of claim 19 wherein the communications channel includes one or more links which are wireless and/or wire links.

25. The apparatus of claim 19 wherein the IV predictor is a coasting component.

26. The apparatus of claim 19 wherein the bit error detector compares predicted IV with received IV bit by bit.

* * * * *